US012671670B2

(12) United States Patent
Gao et al.

(10) Patent No.: US 12,671,670 B2
(45) Date of Patent: Jun. 30, 2026

(54) ADDRESSING PROCESSING METHOD AND APPARATUS, STORAGE MEDIUM, AND ELECTRONIC APPARATUS

(71) Applicant: ZTE Corporation, Shenzhen (CN)

(72) Inventors: Lei Gao, Shenzhen (CN); Wanpeng Fan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 539 days.

(21) Appl. No.: 18/039,559

(22) PCT Filed: Dec. 6, 2021

(86) PCT No.: PCT/CN2021/135826
§ 371 (c)(1),
(2) Date: May 31, 2023

(87) PCT Pub. No.: WO2022/121857
PCT Pub. Date: Jun. 16, 2022

(65) Prior Publication Data
US 2024/0007432 A1      Jan. 4, 2024

(30) Foreign Application Priority Data

Dec. 9, 2020    (CN) .......................... 202011429982.8

(51) Int. Cl.
*H04W 4/00*          (2018.01)
*H04L 61/4541*          (2022.01)
(Continued)

(52) U.S. Cl.
CPC ......... *H04L 61/4541* (2022.05); *H04W 4/025* (2013.01); *H04W 8/26* (2013.01); *H04W 64/00* (2013.01)

(58) Field of Classification Search
CPC ....... H04W 4/025; H04W 8/26; H04W 64/00; H04W 4/029; H04W 88/14; H04W 4/021
See application file for complete search history.

(56) References Cited

U.S. PATENT DOCUMENTS

| | | | |
|---|---|---|---|
| 10,674,319 B1 | 6/2020 | Chandra Mondal | |
| 2018/0199160 A1* | 7/2018 | Edge ...................... | H04W 4/02 |
| 2019/0394746 A1* | 12/2019 | Edge .................... | H04W 24/10 |

FOREIGN PATENT DOCUMENTS

| | | |
|---|---|---|
| CN | 110121892 A | 8/2019 |
| CN | 111836319 A | 8/2019 |

(Continued)

OTHER PUBLICATIONS

3rd Generation Partnership Project, Technical Specification Group Services and Systems Aspects, 3GPP, Dec. 5, 2028, XP051498391.
(Continued)

*Primary Examiner* — Omoniyi Obayanju
(74) *Attorney, Agent, or Firm* — CANTOR COLBURN LLP

(57)          ABSTRACT
Provided in the embodiments of the present disclosure are an addressing processing method and apparatus, a storage medium, and an electronic apparatus. The method is applied to an Access and Mobility Management Function (AMF) and includes: receiving a locating request sent by a Gateway Mobile Location Center (GMLC), wherein the locating request carries a GMLC address or a Location Management Function (LMF) identifier (ID); determining, in a Mobile Equipment Console (MEC) in which the GMLC is deployed, a target LMF address corresponding to the GMLC address or the LMF ID; and sending the locating request to the target LMF address, wherein the locating request is used for instructing a target LMF corresponding to the target LMF address to locate target User Equipment (UE).

12 Claims, 7 Drawing Sheets

(51) Int. Cl.
  *H04W 4/02* (2018.01)
  *H04W 8/26* (2009.01)
  *H04W 64/00* (2009.01)

(56) References Cited

FOREIGN PATENT DOCUMENTS

| | | | |
|---|---|---|---|
| CN | 110913473 A | 3/2020 |
| CN | 111886910 A | 11/2020 |
| WO | 2019218780 A1 | 11/2019 |

OTHER PUBLICATIONS

CATT: Update GMLC function based on access type, vol. SA WG2, Feb. 24, 2020, XP051857978.
European Search Report for corresponding application EP21902562' Mail date Apr. 11, 2024.
Qualcomm Inc, Discussion Paper on 5GC Commercial Location 3GPP Draft, S2-177260, vol. SA WG2, Oct. 17, 2017, XP051359923.
Qualcomm Inc, Location Services Alternatives for 5G System Architecture and 5G procedures, vol. SA WG2, Mar. 26, 2027, XP051247716.
International Search Report for corresponding application PCT/CN2021/135826 filed Dec. 6, 2021; Mail date: Feb. 28, 2022.
Nokia, Nokia Shanghai Bell, LCS exposure to NG-RAN, 3GPP TSG-RAN WG2 Meeting #104 R2-1818183 Spokane, USA, Nov. 12-16, 2018.
Chinese Office Action; Application No. 202011429982.8; Filing Date: Dec. 9, 2020; date of mailing: Apr. 23, 2026; 15 pages.

\* cited by examiner

Fig. 3

Input/output device
108

Transmission device 106

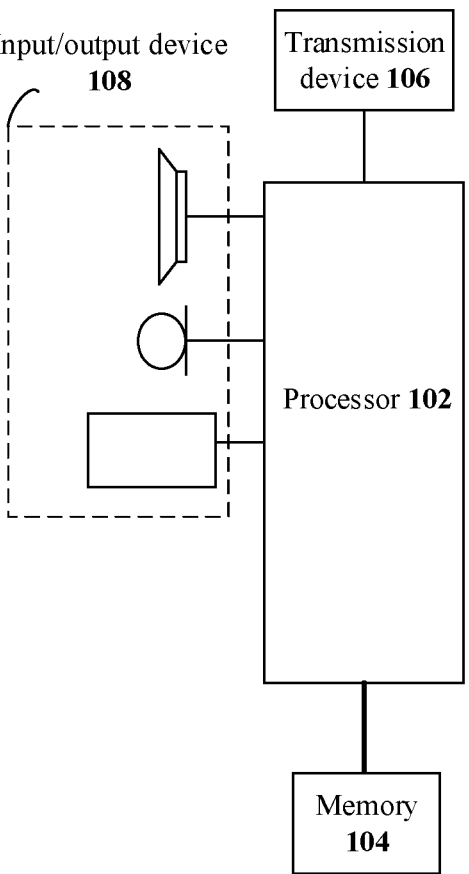

Processor 102

Memory
104

Fig. 4

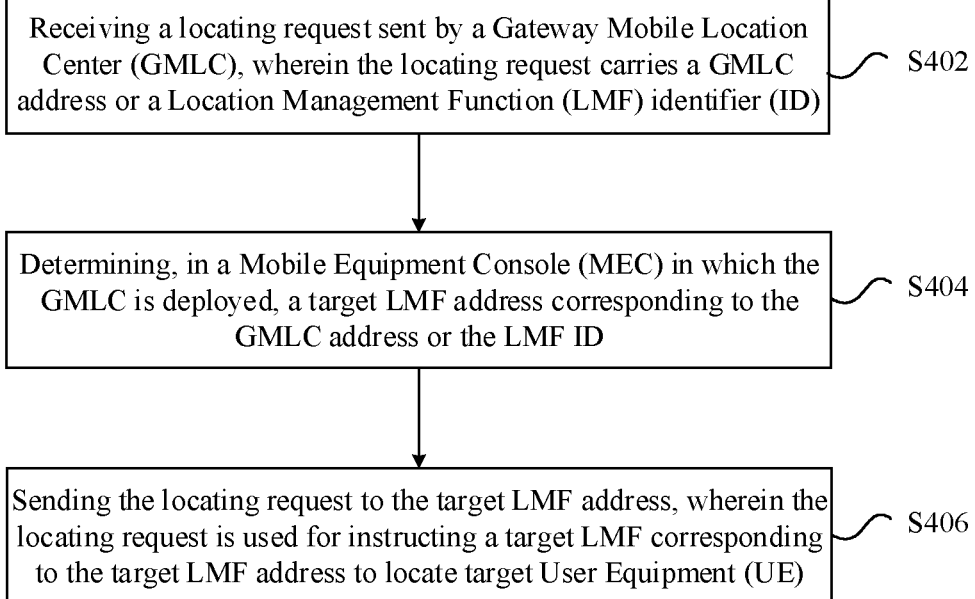

Receiving a locating request sent by a Gateway Mobile Location Center (GMLC), wherein the locating request carries a GMLC address or a Location Management Function (LMF) identifier (ID)          S402

Determining, in a Mobile Equipment Console (MEC) in which the GMLC is deployed, a target LMF address corresponding to the GMLC address or the LMF ID          S404

Sending the locating request to the target LMF address, wherein the locating request is used for instructing a target LMF corresponding to the target LMF address to locate target User Equipment (UE)          S406

Fig. 5

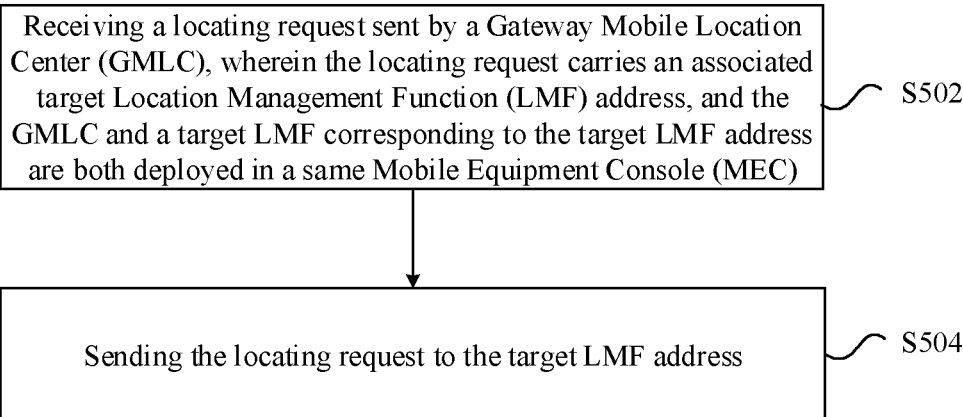

Receiving a locating request sent by a Gateway Mobile Location Center (GMLC), wherein the locating request carries an associated target Location Management Function (LMF) address, and the GMLC and a target LMF corresponding to the target LMF address are both deployed in a same Mobile Equipment Console (MEC) — S502

Sending the locating request to the target LMF address — S504

Fig. 6

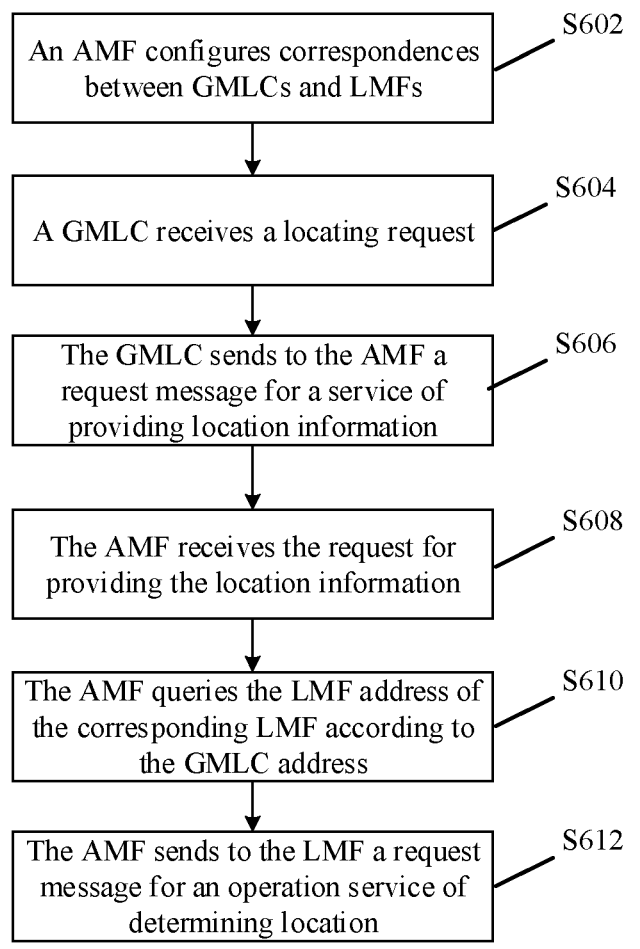

An AMF configures correspondences between GMLCs and LMFs — S602

A GMLC receives a locating request — S604

The GMLC sends to the AMF a request message for a service of providing location information — S606

The AMF receives the request for providing the location information — S608

The AMF queries the LMF address of the corresponding LMF according to the GMLC address — S610

The AMF sends to the LMF a request message for an operation service of determining location — S612

A corresponding LMF address is configured in a GMLC — S702

The GMLC receives a locating request — S704

The GMLC returns a response message for a service of providing location — S706

The AMF receives the request for providing location — S708

The AMF obtains an LMF address — S710

The AMF sends to the LMF a request message for an operation service of determining location — S712

Fig. 8

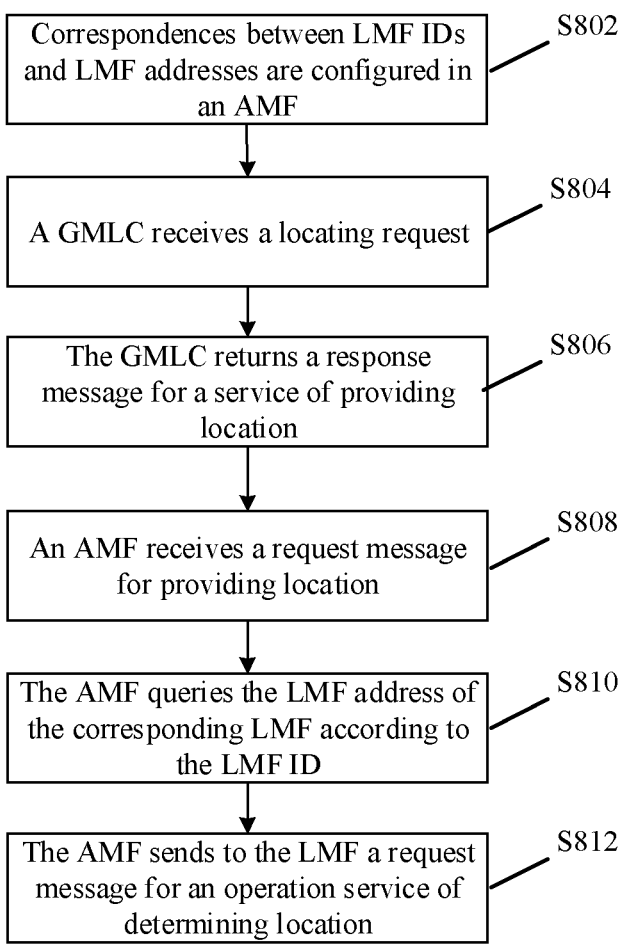

Correspondences between LMF IDs and LMF addresses are configured in an AMF — S802

A GMLC receives a locating request — S804

The GMLC returns a response message for a service of providing location — S806

An AMF receives a request message for providing location — S808

The AMF queries the LMF address of the corresponding LMF according to the LMF ID — S810

The AMF sends to the LMF a request message for an operation service of determining location — S812

Fig. 10

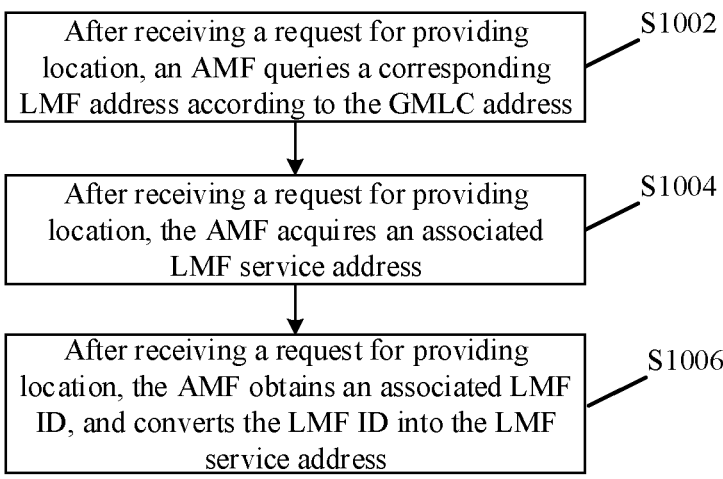

After receiving a request for providing location, an AMF queries a corresponding LMF address according to the GMLC address ⎯ S1002

After receiving a request for providing location, the AMF acquires an associated LMF service address ⎯ S1004

After receiving a request for providing location, the AMF obtains an associated LMF ID, and converts the LMF ID into the LMF service address ⎯ S1006

Fig. 11

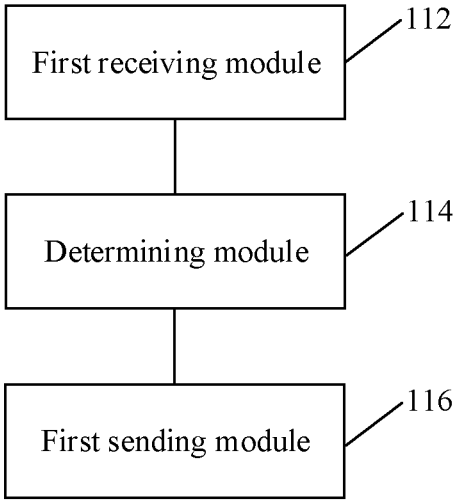

First receiving module — 112

Determining module — 114

First sending module — 116

Fig. 12

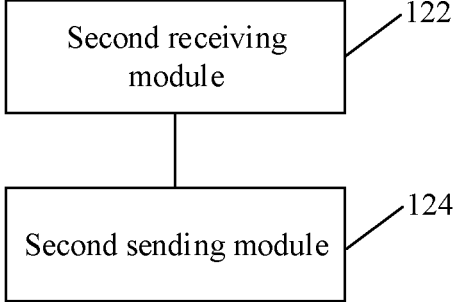

Second receiving module — 122

Second sending module — 124

ADDRESSING PROCESSING METHOD AND APPARATUS, STORAGE MEDIUM, AND ELECTRONIC APPARATUS

CROSS REFERENCE

This application is a National Stage Filing of the PCT International Application No. PCT/CN2021/135826 filed on Dec. 6, 2021, which claims priority to Chinese Application No. 202011429982.8 filed on Dec. 9, 2020, the entirety of which is herein incorporated by reference.

TECHNICAL FIELD

Embodiments of the present disclosure relate to the field of communications technologies, and in particular, to an addressing processing method and apparatus, a storage medium, and an electronic apparatus.

BACKGROUND

Base station locating refers to that in a construction process of a wireless network performed by an operator, a locating capability is output through an Application Programming Interface (API) while providing voice, message, and connection services for a user. A standard API may be called by various locating applications. A government or enterprise customer no longer needs to separately build a platform having the locating capability. The base station locating is a locating technology capable of being replicated and promoted in a large scale. The base station locating technology may be applied to a plurality of industries and customers, has a very low marginal cost, and is a locating technology mainly developed by a communication operator.

Because many enterprises and customers have very strict requirements on data security, locating precision and time delay, and a service scenario is fixed in a certain area, for example, a scenario such as an airport, a subway, a hospital, a factory, a zone, and a shopping mall, it is usually needed to deploy a Gateway Mobile Location Centre (GMLC) and a Location Management Function (LMF) of a locating network element in the control plane into a Mobile Equipment Console (MEC), so as to keep the data within the zone, improve the locating accuracy and reduce the locating delay. By means of an open locating capability provided at the MEC, a capability engine is provided to integrate a high-precision locating capability into APPs in the industry.

FIG. 1 is a schematic diagram (I) of deploying a GMLC and an LMF in an MEC in the related art. As shown in FIG. 1, the GMLC and the LMF are deployed in the MEC, and signaling exchanges with an AMF and a Universal Domain Network (UDM) in a main network of the operator still follow a standard 3rd Generation Partnership Project (3GPP) protocol.

The GMLC and the LMF are deployed at the MEC side, and meanwhile, the requirements of keeping the data within the zone and high-precision locating, which are major concerns of clients in the industry, are also met. Only the LMF selection and the GMLC discovery and selection are defined in 3GPP 23.273.

LMF selection: an Access and Mobility Management Function (AMF) may initiate a request to a corresponding LMF according to an LMF ID carried in a locating message.

GMLC discovery and selection: a client may configure a GMLC address, or may execute a DNS query to determine the GMLC address. The AMF may configure the GMLC address and send a location estimate to the GMLC when performing delayed locating and MO-LR locating.

However, the two flows, i.e., the LMF selection and the GMLC discovery and selection, do not support associating the GMLC with the LMF. FIG. 2 is a schematic diagram (II) of deploying a GMLC and an LMF in an MEC in the related art. As shown in FIG. 2, after a GMLC and an LMF are deployed in an MEC, there will be many sets of GMLC and LMF deployed in the MEC/MECs, and there are also GMLC and LMF deployed in the main network of the operator. For example, in a scenario in which a GMLC is constructed at the central part of an operator, LMFs are deployed in a plurality of large zones, and GMLCs and LMFs are deployed in MEC/MECs in a plurality of enterprise zones, when the GMLC deployed in the enterprise zone initiates a locating request to the AMF in the main network, the AMF cannot find the LMF in the MEC according to a general discovery mechanism specified in the 3GPP standard.

Aiming at the problem in the related art that when a GMLC and an LMF are deployed in an MEC, an AMF cannot successfully locate a UE in a zone according to a general discovery mechanism specified in the 3GPP standard, no solution has been proposed yet.

SUMMARY

Embodiments of the present disclosure provide an addressing processing method and apparatus, a storage medium, and an electronic apparatus, which may at least solve the problem in the related art that when a GMLC and an LMF are deployed in an MEC, an AMF cannot successfully locate a UE in a zone according to a general discovery mechanism specified in the 3GPP standard.

According to some embodiments of the present disclosure, provided is an addressing processing method, which is applied to an Access and Mobility Management Function (AMF) and includes:

receiving a locating request sent by a Gateway Mobile Location Center (GMLC), wherein the locating request carries a GMLC address or a Location Management Function (LMF) identifier (ID);

determining, in a Mobile Equipment Console (MEC) in which the GMLC is deployed, a target LMF address corresponding to the GMLC address or the LMF ID; and sending the locating request to the target LMF address, wherein the locating request is used for instructing a target LMF corresponding to the target LMF address to locate target User Equipment (UE).

In some exemplary embodiments, determining, in the MEC in which the GMLC is deployed, the target LMF address corresponding to the GMLC address or the LMF ID includes: determining the target LMF address corresponding to the GMLC address according to pre-configured correspondences between GMLC addresses and LMF addresses; or determining the target LMF address corresponding to the LMF ID according to pre-configured correspondences between LMF IDs and LMF addresses.

In some exemplary embodiments, the method may further include: configuring correspondences between GMLC addresses and LMF addresses in the MEC; or configuring correspondences between LMF IDs and LMF addresses in the MEC.

In some exemplary embodiments, after sending the locating request to the target LMF address, the method may further include: receiving a locating response sent by the target LMF corresponding to the target LMF address after the target LMF corresponding to the target LMF address locates the target UE, wherein the locating response carries location information of the target UE.

According to some other embodiments of the present disclosure, also provided is an addressing processing method, which is applied to an Access and Mobility Management Function (AMF) and includes: receiving a locating request sent by a Gateway Mobile Location Center (GMLC), wherein the locating request carries an associated target Location Management Function (LMF) address, and the GMLC and a target LMF corresponding to the target LMF address are both deployed in a same Mobile Equipment Console (MEC); and sending the locating request to the target LMF address.

In some exemplary embodiments, after sending the locating request to the target LMF address, the method may further include: receiving a locating response sent by the target LMF corresponding to the target LMF address after the target LMF corresponding to the target LMF address locates target User Equipment (UE), wherein the locating response carries location information of the target UE.

According to some other embodiments of the present disclosure, also provided is an addressing processing apparatus, which is applied to an Access and Mobility Management Function (AMF) and includes:

a first receiving module, configured to receive a locating request sent by a Gateway Mobile Location Center (GMLC), wherein the locating request carries a GMLC address or a Location Management Function (LMF) identifier ID;

a determining module, configured to determine, in a Mobile Equipment Console (MEC) in which the GMLC is deployed, a target LMF address corresponding to the GMLC address or the LMF ID; and a first sending module, configured to send the locating request to the target LMF address, wherein the locating request is used for instructing a target LMF corresponding to the target LMF address to locate target User Equipment (UE).

In some exemplary embodiments, the determining module is further configured to determine the target LMF address corresponding to the GMLC address according to pre-configured correspondences between GMLC addresses and LMF addresses; or determine the target LMF address corresponding to the LMF ID according to pre-configured correspondences between LMF IDs and LMF addresses.

In some exemplary embodiments, the apparatus may further include: a configuring module, configured to configure correspondences between GMLC addresses and LMF addresses in the MEC; or configure correspondences between LMF IDs and LMF addresses in the MEC.

In some exemplary embodiments, the first receiving module is further configured to receive a locating response sent by the target LMF corresponding to the target LMF address after the target LMF corresponding to the target LMF address locates the target UE, wherein the locating response carries location information of the target UE.

According to some other embodiments of the present disclosure, also provided is an addressing processing apparatus, which is applied to an Access and Mobility Management Function (AMF) and includes:

a second receiving module, configured to receive a locating request sent by a Gateway Mobile Location Center (GMLC), wherein the locating request carries an associated target Location Management Function (LMF) address, and the GMLC and a target LMF corresponding to the target LMF address are both deployed in a same Mobile Equipment Console (MEC); and a second sending module, configured to send the locating request to the target LMF address.

In some exemplary embodiments, the second receiving module is further configured to receive a locating response sent by the target LMF corresponding to the target LMF address after the target LMF corresponding to the target LMF address locates target User Equipment (UE), wherein the locating response carries location information of the target UE.

According to some other embodiments of the present disclosure, also provided is a computer-readable storage medium, wherein the computer-readable storage medium stores a computer program, and the computer program is configured to execute the operations in any method embodiment when running.

According to some other embodiments of the present disclosure, also provided is an electronic apparatus, including a memory and a processor, wherein the memory stores a computer program, and the processor is configured to run the computer program so as to execute the operations in any one of the method embodiments.

In the embodiments of the present disclosure, an AMF receives a locating request sent by a GMLC, wherein the locating request carries a GMLC address or an LMF ID; the AMF determines, in an MEC in which the GMLC is deployed, a target LMF address corresponding to the GMLC address or the LMF ID; and the AMF sends the locating request to the target LMF address, wherein the locating request is used for instructing a target LMF corresponding to the target LMF address to locate target UE. The problem in the related art that when a GMLC and an LMF are deployed in an MEC, an AMF cannot successfully locate a UE in a zone according to a general discovery mechanism specified in the 3GPP standard is solved. By determining, according to a GMLC address or an LMF ID carried in a locating request, a corresponding target LMF address in a MEC to which a GMLC is deployed, an LMF corresponding to a GMLC in a zone can be found, so that a UE in the zone can be successfully located.

BRIEF DESCRIPTION OF THE DRAWINGS

FIG. 3 is a block diagram showing the hardware structure of a mobile terminal that implements an addressing processing method according to the embodiments of the present disclosure;

FIG. 4 is a flowchart (I) of an addressing processing method according to the embodiments of the present disclosure;

FIG. 5 is a flowchart (II) of an addressing processing method according to the embodiments of the present disclosure;

FIG. 6 is a flowchart (I) of an addressing processing method according to some exemplary embodiments of the present disclosure;

FIG. 8 is a flowchart (III) of an addressing processing method according to some exemplary embodiments of the present disclosure;

FIG. 10 is a diagram of a 5GC-MT-LR flow after deploying a GMLC and an LMF in an MEC according to the improvement made in some exemplary embodiments of the present disclosure;

FIG. 11 is a block diagram (I) of an addressing processing apparatus according to the embodiments of the present disclosure; and FIG. 12 is a block diagram (II) of an addressing processing apparatus according to the embodiments of the present disclosure.

DETAILED DESCRIPTION

Figure 1:
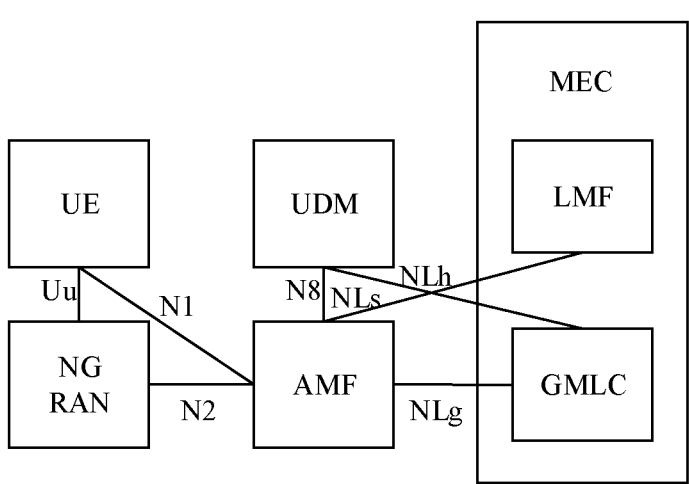
FIG. 1 is a schematic diagram (I) of deploying a GMLC and an LMF in an MEC in the related art.
Figure 2:
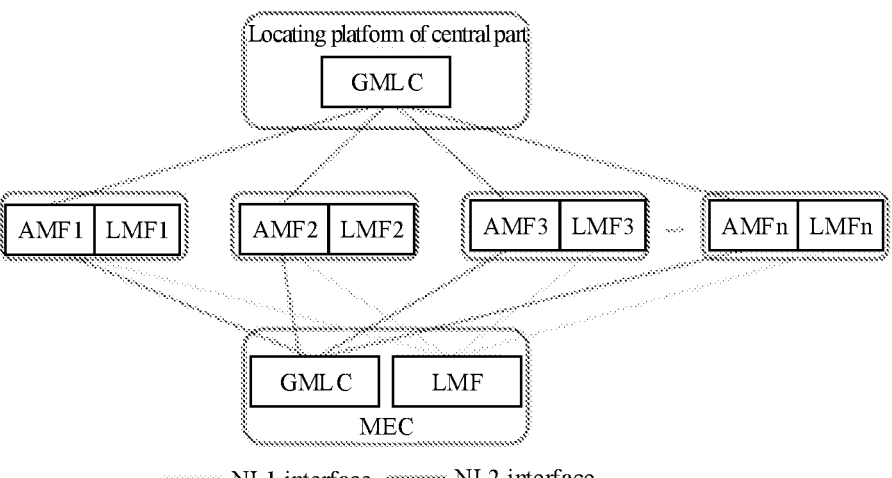
FIG. 2 is a schematic diagram (II) of deploying a GMLC and an LMF in an MEC in the related art.

The embodiments of the present disclosure will be described below in detail with reference to the drawings and embodiments.

It should be noted that the terms "first" and "second" in the description, claims, and accompanying drawings of the present disclosure are used to distinguish similar objects, and are not necessarily used to describe a specific sequence or order.

The method provided in the embodiments of the present disclosure may be executed in a mobile terminal, a computer terminal, or a similar computing apparatus. Taking the implementation on a mobile terminal as an example, FIG. 3 is a block diagram showing the hardware structure of a mobile terminal that implements an addressing processing method according to the embodiments of the present disclosure. As shown in FIG. 3, the mobile terminal may include one or more (only one is shown in FIG. 3) processors 102 (the processor 102 may include, but is not limited to, a processing device such as a Micro Controller Unit (MCU) or a Field Programmable Gate Array (FPGA)) and a memory 104 configured to store data. In some exemplary implementations, the foregoing mobile terminal may further include a transmission device 106 for performing a communication function and an input/output device 108. A person having ordinary skill in the art may understand that the structure shown in FIG. 3 is merely exemplary, and does not limit the structure of the foregoing mobile terminal. For example, the mobile terminal may further include more or fewer components than shown in FIG. 3, or have a different configuration from that shown in FIG. 3.

The memory 104 may be used for storing a computer program, for example, a software program and modules of application software, such as a computer program corresponding to the addressing processing method in the embodiments of the present disclosure. The one or more processors 102 run the computer program stored in the memory 104, so as to execute various functional applications and data processing, that is, to implement the foregoing method. The memory 104 may include high-speed random access memory, and may also include non-volatile memory, such as one or more magnetic storage devices, flash memory, or other non-volatile solid-state memory. In some instances, the memory 104 may further include a memory remotely located with respect to the one or more processors 102, and the memory remotely located with respect to the one or more processors 102 may be connected to the mobile terminal over a network. Examples of such network include, but are not limited to, Internet, intranet, local area network, mobile communication network, and combinations thereof.

The transmission device 106 is configured to receive or transmit data via a network. Specific examples of the described network may include a wireless network provided by a communication provider of the mobile terminal. In an example, the transmission device 106 may include a Network Interface Controller (NIC) that may be coupled to other network devices via a base station and thus may communicate with the Internet. In an example, the transmission device 106 can be a Radio Frequency (RF) module for communicating with the Internet in a wireless manner.

Based on the described mobile terminal or network architecture, the present embodiment provides an addressing processing method, which is applied to an Access and Mobility Management Function (AMF). FIG. 4 is a flowchart (I) of an addressing processing method according to the embodiments of the present disclosure, and as shown in FIG. 4, the flow includes the following operations S402 to S406.

At S402, a locating request sent by a GMLC is received, wherein the locating request carries a GMLC address or an LMF ID.

At S404, a target LMF address corresponding to the GMLC address or the LMF ID is determined in an MEC in which the GMLC is deployed.

At S406, the locating request is sent to the target LMF address, wherein the locating request is used for instructing a target LMF corresponding to the target LMF address to locate target UE.

Through the operations S402 to S406, an AMF receives a locating request sent by a GMLC, wherein the locating request carries a GMLC address or an LMF ID; the AMF determines, in an MEC in which the GMLC is deployed, a target LMF address corresponding to the GMLC address or the LMF ID; and the AMF sends the locating request to the target LMF address, wherein the locating request is used for instructing a target LMF corresponding to the target LMF address to locate target UE. The problem in the related art that when a GMLC and an LMF are deployed in an MEC, an LMF discovered by an AMF according to a general discovery mechanism specified in the 3GPP standard cannot successfully locate a UE in a zone is solved. By determining, according to a GMLC address or an LMF ID carried in a locating request, a corresponding target LMF address in a MEC to which a GMLC is deployed, an LMF corresponding to a GMLC in a zone can be found, so that a UE in the zone can be successfully located.

In some exemplary embodiments, the operation S404 may include an operation that the target LMF address corresponding to the GMLC address is determined according to pre-configured correspondences between GMLC addresses and LMF addresses, or an operation that the target LMF address corresponding to the LMF ID is determined according to pre-configured correspondences between LMF IDs and LMF addresses.

Namely, correspondences between GMLC addresses and LMF addresses may be preset, and then the corresponding target LMF address can be found according to the GMLC address. Alternatively, correspondences between LMF IDs and LMF addresses may be preset, and then the corresponding target LMF address can be found according to the LMF ID.

In some exemplary embodiments, the method may further include an operation of configuring correspondences between GMLC addresses and LMF addresses in the MEC, or an operation of configuring correspondences between LMF IDs and LMF addresses in the MEC.

That is, the correspondences between GMLC addresses and LMF addresses in the MEC or the correspondences between LMF IDs and LMF addresses in the MEC may be configured.

In an exemplary embodiment, after the operation S406, a locating response sent by the target LMF corresponding to the target LMF address after the target LMF corresponding to the target LMF address locates the target UE is received, wherein the locating response carries location information of the target UE.

In other words, after the locating request is sent to the target LMF, a locating response sent by the LMF after the target UE performs locating is received.

According to another embodiment of the present disclosure, provided is an addressing processing method, which is applied to an Access and Mobility Management Function (AMF). FIG. 5 is a flowchart (II) of an addressing processing method according to the embodiments of the present disclosure. As shown in FIG. 5, the flow includes the following operations S502 and S504.

At S502, a locating request sent by a GMLC is received, wherein the locating request carries an associated target LMF address, and the GMLC and a target LMF corresponding to the target LMF address are both deployed in a same MEC.

At S504, the locating request is sent to the target LMF address.

By means of the described operations S502 to S504, a locating request sent by a GMLC is received, wherein the locating request carries an associated target LMF address, and the GMLC and a target LMF corresponding to the target LMF address are both deployed in a same MEC; and the locating request is sent to the target LMF address, so that a locating request can be sent to the target LMF address according to the associated target LMF address carried in the locating request.

In an exemplary embodiment, after the operation S504, the method may further include: a locating response sent by the target LMF corresponding to the target LMF address after the target LMF corresponding to the target LMF address locates the target UE is received, wherein the locating response carries location information of the target UE.

In other words, after the locating request is sent, the location information of the target UE sent after the LMF locates the target UE is received.

FIG. 6 is a flowchart (I) of an addressing processing method according to some exemplary embodiments of the present disclosure. As shown in FIG. 6, the method includes the following operations S602 to S612.

At S602, an AMF configures correspondences between GMLCs and LMFs.

At S604, a GMLC receives a locating request.

At S606, the GMLC sends to the AMF a request message for a service of providing location information, so as to ask for a current location of UE, i.e., the GMLC calls Namf_Location_ProvidePositioningInfo in which a GMLC address is carried.

At S608, the AMF receives the request for providing the location information, i.e., a ProvidePositioningInfo request.

At S610, the AMF queries the LMF address of the corresponding LMF according to the GMLC address.

At S612, the AMF sends to the LMF a request message for an operation service of determining location, i.e., the AMF calls Nlmf_Location_DetermineLocation.

Through the above operations, the correspondences between the GMLCs and the LMFs are configured in the AMF; the GMLC calls, from the AMF, Namf_Location_ProvidePositioningInfo in which a field for carrying the GMLC address is added; after receiving the ProvidePositioningInfo request, the AMF queries the LMF address of the corresponding LMF according to the GMLC address, and calls, from the LMF, the Nlmf_Location_DetermineLocation service.

Figure 7:
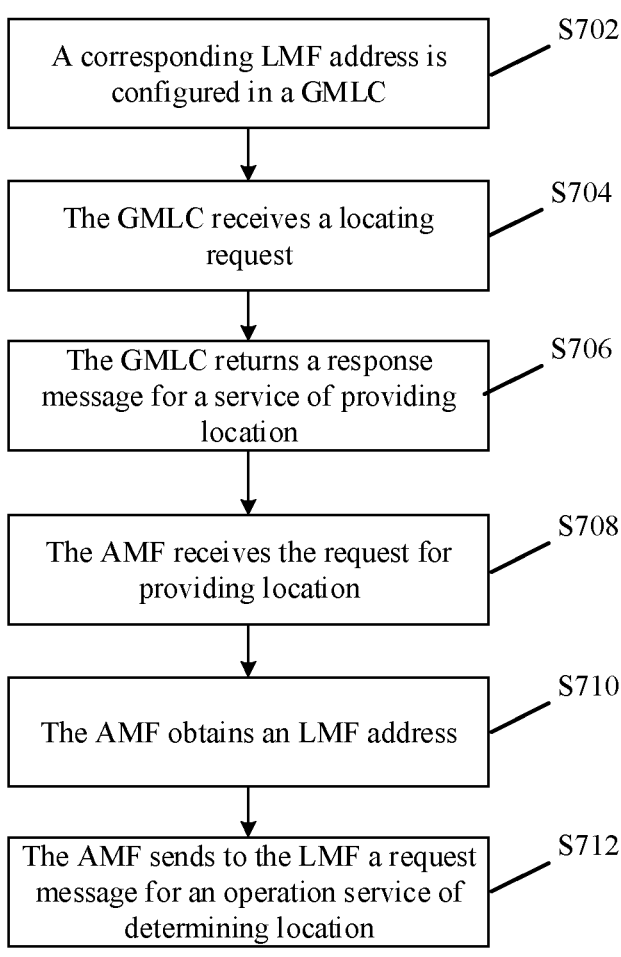
FIG. 7 is a flowchart (II) of an addressing processing method according to some exemplary embodiments of the present disclosure.

FIG. 7 is a flowchart (II) of an addressing processing method according to some exemplary embodiments of the present disclosure. As shown in FIG. 7, the method includes the following operations S702 to S712.

At S702, a corresponding LMF address is configured in a GMLC.

At S704, the GMLC receives a locating request.

At S706, the GMLC returns a response message for a service of providing location, i.e., the GMLC calls Namf_Location_ProvidePositioningInfo in which an associated LMF service address is carried.

At S708, the AMF receives the request for providing location, i.e., a ProvidePositioningInfo request.

At S710, the AMF obtains an LMF address.

At S712, the AMF sends to the LMF a request message for an operation service of determining location, i.e., the AMF calls Nlmf_Location_DetermineLocation.

By means of the described operations, the following technical effects can be achieved. A GMLC deployed in an MEC is configured with an LMF address associated with the GMLC; when the GMLC calls, from the AMF, Namf_Location_ProvidePositioningInfo, a field is added for carrying the associated LMF service address; after obtaining the LMF address, the AMF calls Nlmf_Location_DetermineLocation service from the LMF.

FIG. 8 is a flowchart (III) of an addressing processing method according to some exemplary embodiments of the present disclosure. As shown in FIG. 8, the method includes the following operations S802 to S812.

At S802, correspondences between LMF IDs and LMF addresses are configured in an AMF.

At S804, a GMLC receives a locating request.

At S806, the GMLC returns a response message for a service of providing location, i.e., the GMLC calls Namf_Location_ProvidePositioningInfo in which an associated LMF ID is carried.

At S808, an AMF receives a request message for providing location, i.e., a ProvidePositioningInfo request.

At S810, the AMF queries the LMF address of the corresponding LMF according to the LMF ID.

At 812, the AMF sends to the LMF a request message for an operation service of determining location, specifically, the AMF calls Nlmf_Location_DetermineLocation.

Through the above operations, the correspondences between the LMF IDs and the LMF addresses are configured in the AMF; the GMLC calls Namf_Location_ProvidePositioningInfo from the AMF, and adds a field for carrying the LMF ID; after receiving the locating request, the AMF queries the LMF address of the corresponding LMF according to the LMF ID, and calls the Nlmf_Location_DetermineLocation service from the LMF.

The above embodiments can successfully solve the problem concerning how the AMF finds the LMF corresponding to the GMLC when a GMLC and an LMF are deployed in an MEC, and solve the technical obstacle of subsidence of the control plane locating network element into the MEC.

Figure 9:
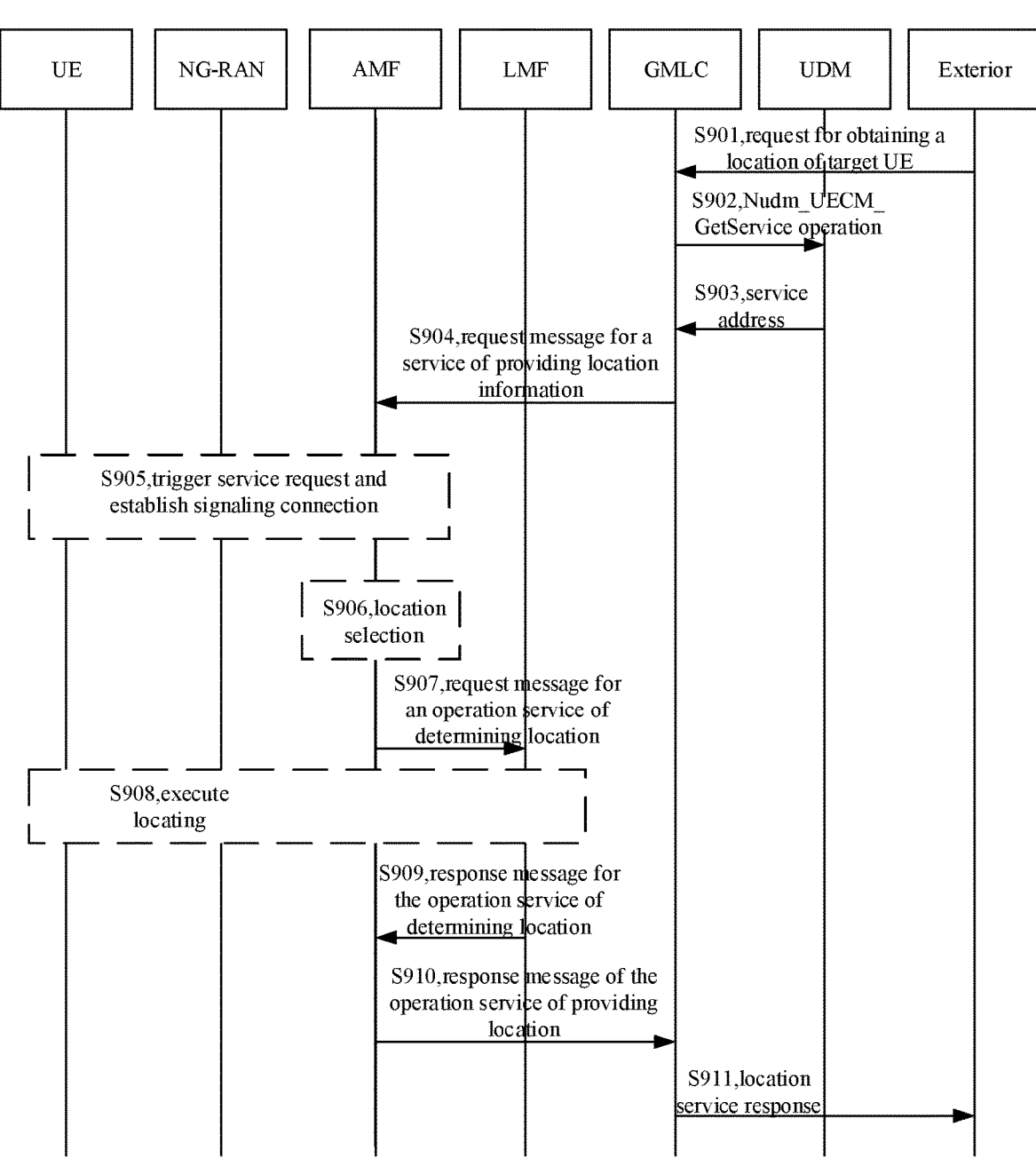
FIG. 9 is a diagram of a standard 5GC-MT-LR flow according to some exemplary embodiments of the present disclosure.

FIG. 9 is a diagram of a standard 5GC-MT-LR flow according to some exemplary embodiments of the present disclosure. As shown in FIG. 9, the flow includes the following operations S901 to S911.

At S901, an LCS client sends to a GMLC a request for obtaining a location of target UE, wherein the request may include a required QoS, a supported GAD shape and a client type.

At S902, the GMLC calls a Nudm_UECM_Get service operation of a UDM to which the target UE belongs.

At S903, the UDM returns a service address of a current serving AMF to the GMLC.

At S904, the GMLC sends to the AMF a request message for a service of providing location information, specifically a Namf_Location_ProvideRequestPosInfo service, so as to request a current location of UE, i.e., the GMLC calls a location information providing service of the AMF to request the current location of the UE.

At S905, if the UE is in a CM IDLE state, the AMF initiates a network-triggered service request process so as to establish a signaling connection with the UE.

At S906, the AMF uses an LMF selection function to determine an LMF for estimating the location of a target UE or selects an LMF based on local configuration of the AMF.

At S907, the AMF sends to the LMF a request message for an operation service of determining location, specifically, an Nlmf_Location_DetermineLocation service operation, so as to request a current location of the UE, that is, the AMF calls the location determining operation service of the LMF to request the current location of the UE.

At S908, the LMF executes locating.

At S909, the LMF returns to the AMF a response message for a service of determining location, specifically a Nlmf_Location_DetermineLocation response, so as to return the current location of the UE, that is, the LMF returns the current location of the UE through the response message for the service of determining location.

At S910, the AMF returns to the GMLC a response message for the operation service of providing location, specifically a Namf_Location_ProvidePositioningInfo response, so as to return the current location of the UE, i.e., the AMF returns the current location of the UE by providing a response message for the operation service of providing location.

At S911, the GMLC sends a location service response to the LCS Client.

In the above standard 5GC-MT-LR procedure, when the AMF looks for the LMF, in order to enable the AMF to find the LMF address of the LMF corresponding to the GMLC in a case where the GMLC and the LMF are deployed in the MEC, the operation S906 is expanded compared with the operation S706. FIG. 10 is a diagram of a 5GC-MT-LR flow after deploying a GMLC and an LMF in an MEC according to the improvement made in some exemplary embodiments of the present disclosure. As shown in FIG. 10, the method includes the following operations S1002 to S1006.

At S1002, after an AMF receives a request for providing location (namely, ProvidePositioningInfo request), the AMF queries an LMF address of a corresponding LMF according to the GMLC address.

At S1004, after the AMF receives a request for providing location (namely, a ProvidePositioningInfo request), the AMF acquires an associated LMF service address.

At S1006, after receiving a request for providing location (namely, a ProvidePositioningInfo request), the AMF obtains an associated LMF ID, and converts the LMF ID into the LMF service address.

According to some other embodiments of the present disclosure, an addressing processing apparatus is also provided, which is applied to an Access and Mobility Management Function (AMF). FIG. 11 is a block diagram (I) of an addressing processing apparatus according to the embodiments of the present disclosure, and as shown in FIG. 11, the apparatus includes:

a first receiving module 112, configured to receive a locating request sent by a Gateway Mobile Location Center (GMLC), wherein the locating request carries a GMLC address or a Location Management Function (LMF) identifier ID;

a determining module 114, configured to determine, in a Mobile Equipment Console (MEC) in which the GMLC is deployed, a target LMF address corresponding to the GMLC address or the LMF ID; and a first sending module 116, configured to send the locating request to the target LMF address, wherein the locating request is used for instructing a target LMF corresponding to the target LMF address to locate target User Equipment (UE).

By means of the device, the problem in the related art that when a GMLC and an LMF are deployed in an MEC, an LMF discovered by an AMF according to a general discovery mechanism specified in the 3GPP standard cannot successfully locate a UE in a zone can be solved. By determining, according to a GMLC address or an LMF ID carried in a locating request, a corresponding target LMF address in a MEC to which a GMLC is deployed, an LMF corresponding to a GMLC in a zone can be found, so that a UE in the zone can be successfully located.

In an exemplary embodiment, the determining module is further configured to determine the target LMF address corresponding to the GMLC address according to pre-configured correspondences between GMLC addresses and LMF addresses; or determine the target LMF address corresponding to the LMF ID according to pre-configured correspondences between LMF IDs and LMF addresses.

Namely, correspondences between GMLC addresses and LMF addresses may be preset, and then the corresponding target LMF address can be found according to the GMLC address. Alternatively, correspondences between LMF IDs and LMF addresses may be preset, and then the corresponding target LMF address can be found according to the LMF ID.

In an exemplary embodiment, the apparatus may further include: a configuring module, configured to configure correspondences between GMLC addresses and LMF addresses in the MEC; or configuring correspondences between LMF IDs and LMF addresses in the MEC.

That is, the correspondences between GMLC addresses and LMF addresses in the MEC or the correspondences between LMF IDs and LMF addresses in the MEC may be configured.

In an exemplary embodiment, the first receiving module 112 is further configured to receive a locating response sent by the target LMF corresponding to the target LMF address after the target LMF corresponding to the target LMF address locates the target UE, wherein the locating response carries location information of the target UE.

In other words, after the locating request is sent to the target LMF, a locating response sent by the LMF after the target UE performs locating is received.

According to some other embodiments of the present disclosure, also provided is an addressing processing apparatus, which is applied to an Access and Mobility Management Function (AMF). FIG. 12 is a block diagram (II) of an addressing processing apparatus according to the embodiments of the present disclosure. As shown in FIG. 12, the apparatus includes:

a second receiving module 122, configured to receive a locating request sent by a Gateway Mobile Location Center (GMLC), wherein the locating request carries an associated target Location Management Function (LMF) address, and the GMLC and a target LMF corresponding to the target LMF address are both deployed in a same Mobile Equipment Console (MEC); and a second sending module 124, configured to send the locating request to the target LMF address.

In an exemplary embodiment, the second receiving module 122 is further configured to receive a locating response sent by the target LMF corresponding to the target LMF address after the target LMF corresponding to the target LMF address locates target User Equipment (UE), wherein the locating response carries location information of the target UE.

In other words, after the locating request is sent, the location information of the target UE sent after the LMF locates the target UE is received.

The embodiments of the present disclosure further provide a computer-readable storage medium. The computer-readable storage medium stores a computer program, wherein the computer program is configured to execute the operations in any one of the method embodiments when running.

In some exemplary embodiments, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure further provide an electronic apparatus, including a memory and a processor, wherein the memory stores a computer program, and the processor is configured to run the computer program so as to execute the operations in any one of the method embodiments.

In some exemplary embodiments, the electronic apparatus may further include a transmission device and an input/output device, wherein the transmission device is connected to the processor, and the input/output device is connected to the processor.

For specific examples of the embodiment, reference may be made to the examples described in the foregoing embodiments and exemplary embodiments, and details are not repeatedly described in this embodiment.

Obviously, those having ordinary skill in the art should understand that each module or each operation of the present disclosure can be implemented by a universal computing device. The modules or the operations may be centralized on a single computing device or distributed on a network composed of a plurality of computing devices, and may be implemented by program codes executable for the computing devices, so that they can be stored in a storage device and executed by the computing devices. Furthermore, under some conditions, the shown or described operations can be executed in a sequence different from that described here, or they are made into integrated circuit modules respectively, or a plurality of modules or operations therein are made into a single integrated circuit module for implementation. Thus, the present disclosure is not limited to any particular combination of hardware and software.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. An addressing processing method, applied to an Access and Mobility Management Function (AMF) and comprising:

receiving a locating request sent by a Gateway Mobile Location Center (GMLC), wherein the locating request carries a GMLC address or a Location Management Function (LMF) identifier (ID);

determining, in a Mobile Equipment Console (MEC) in which the GMLC is deployed, a target LMF address corresponding to the GMLC address or the LMF ID, wherein determining, in the MEC in which the GMLC is deployed, the target LMF address corresponding to the GMLC address or the LMF ID comprises: determining the target LMF address corresponding to the GMLC address according to pre-configured correspondences between GMLC addresses and LMF addresses; or determining the target LMF address corresponding to the LMF ID according to pre-configured correspondences between LMF IDs and LMF addresses; and sending a locating request to the target LMF address, wherein the locating request is used for instructing a target LMF corresponding to the target LMF address to locate target User Equipment (UE).

2. The method according to claim 1, further comprising: configuring correspondences between GMLC addresses and LMF addresses in the MEC; or configuring correspondences between LMF IDs and LMF addresses in the MEC.

3. The method according to claim 1, wherein after sending the locating request to the target LMF address, the method further comprises:

receiving a locating response sent by the target LMF corresponding to the target LMF address after the target LMF corresponding to the target LMF address locates the target UE, wherein the locating response carries location information of the target UE.

4. An addressing processing apparatus, applied to an Access and Mobility Management Function (AMF) and comprising a memory storing instructions and a processor in communication with the memory, wherein the processor is configured to execute the instructions to:

receive a locating request sent by a Gateway Mobile Location Center (GMLC), wherein the locating request carries a GMLC address or a Location Management Function (LMF) identifier ID;

determine, in a Mobile Equipment Console (MEC) in which the GMLC is deployed, a target LMF address corresponding to the GMLC address or the LMF ID; and send a locating request to the target LMF address, wherein the locating request is used for instructing a target LMF corresponding to the target LMF address to locate target User Equipment (UE), wherein the processor is further configured to execute the instructions to determine the target LMF address corresponding to the GMLC address according to pre-configured correspondences between GMLC addresses and LMF addresses; or determine the target LMF address corresponding to the LMF ID according to pre-configured correspondences between LMF IDs and LMF addresses.

5. A non-transitory computer-readable storage medium, wherein the computer-readable storage medium stores a computer program, and the computer program is configured to execute the method according to claim 1 when running.

6. An electronic apparatus, comprising a memory and a processor, wherein the memory stores a computer program, and the processor is configured to run the computer program to execute the method according to claim 1.

7. The method according to claim 1, wherein the locating request sent by the GMLC comprises a request message for a service of providing location information.

8. The method according to claim 1, wherein the locating request sent to the target LMF address comprises a request message for an operation service of determining location.

9. The apparatus according to claim 4, wherein the processor is further configured to execute the instructions to configure correspondences between GMLC addresses and LMF addresses in the MEC; or configure correspondences between LMF IDs and LMF addresses in the MEC.

10. The apparatus according to claim 4, wherein the processor is further configured to execute the instructions to receive a locating response sent by the target LMF corresponding to the target LMF address after the target LMF corresponding to the target LMF address locates the target UE, wherein the locating response carries location information of the target UE.

11. The apparatus according to claim 4, wherein the locating request sent by the GMLC comprises a request message for a service of providing location information.

12. The apparatus according to claim 4, wherein the locating request sent to the target LMF address comprises a request message for an operation service of determining location.

\* \* \* \* \*